United States Patent
Doré

(12)

(10) Patent No.: US 11,968,953 B2
(45) Date of Patent: Apr. 30, 2024

(54) APPARATUS AND METHOD FOR FUSING CURD

(71) Applicant: Michel Doré, Embrun (CA)

(72) Inventor: Michel Doré, Embrun (CA)

(*) Notice: Subject to any disclaimer, the term of this patent is extended or adjusted under 35 U.S.C. 154(b) by 576 days.

(21) Appl. No.: 17/277,072

(22) PCT Filed: Sep. 19, 2019

(86) PCT No.: PCT/CA2019/051332
§ 371 (c)(1),
(2) Date: Mar. 17, 2021

(87) PCT Pub. No.: WO2020/056512
PCT Pub. Date: Mar. 26, 2020

(65) Prior Publication Data
US 2022/0046888 A1  Feb. 17, 2022

Related U.S. Application Data

(60) Provisional application No. 62/733,253, filed on Sep. 19, 2018.

(51) Int. Cl.
*A01J 25/12* (2006.01)
*A23C 19/06* (2006.01)
*A01J 25/13* (2006.01)

(52) U.S. Cl.
CPC ............ *A01J 25/12* (2013.01); *A01J 25/123* (2013.01); *A23C 19/061* (2013.01); *A01J 25/13* (2013.01)

(58) Field of Classification Search
CPC .......... A01J 25/12; A01J 25/123; A01J 25/13; A01J 25/167; A01J 25/00
(Continued)

(56) References Cited

U.S. PATENT DOCUMENTS 2,904,441 A * 9/1959 Grindrod .............. B65B 25/001
426/272
3,468,026 A * 9/1969 Robertson .............. A01J 25/112
425/85

(Continued)

FOREIGN PATENT DOCUMENTS

AU    1357254    *  6/1974 .............. A01J 25/12
EP    0691074 A1    1/1996
(Continued)

OTHER PUBLICATIONS

International Patent Application No. PCT/CA2019/051332, International Search Report and Written Opinion dated Dec. 5, 2019.
(Continued)

*Primary Examiner* — Reginald Alexander
(74) *Attorney, Agent, or Firm* — Louis B. Allard

(57) ABSTRACT

An apparatus for fusing curd and a method for fusing curd. The curd is fused in the apparatus, which is configured to form a curd stack in a container that has a temperature comprised within a temperature range that favors acidification of the cheese curd in the curd stack. The formation of the curd stack compresses the cheese curd in the curd stack, which causes the curd stack to express whey as the acidification of the curd takes place and as the syneresis process takes place. The curd stack is subjected to a vacuum, which assists in the removal of air from the curd stack. The curd stack has a continuous casein matrix, which allows for a cheese block obtained from the curd stack to be milled into cheese curds, which have substantially similar dimensions and very few fines.

20 Claims, 4 Drawing Sheets

(58) Field of Classification Search
USPC .......................................... 99/453, 454, 456
See application file for complete search history.

(56) References Cited

U.S. PATENT DOCUMENTS

| | | |
|---|---|---|
| 4,152,101 A | 5/1979 | Charles |
| 4,157,680 A * | 6/1979 | Charles ................ A01J 25/13 99/454 |
| 4,415,594 A | 11/1983 | Czulak et al. |
| 4,898,745 A | 2/1990 | Zamzow et al. |
| 4,942,052 A | 7/1990 | Posdal |
| 5,175,014 A | 12/1992 | Brockwell et al. |
| 5,327,818 A * | 7/1994 | Olivetti ................ A23C 9/1223 366/144 |
| 5,520,934 A | 5/1996 | Meilleur |
| 6,180,153 B1 * | 1/2001 | Palus ..................... A23C 19/05 426/582 |
| 2004/0144262 A1 | 7/2004 | Mueller |
| 2006/0216373 A1 | 9/2006 | Mehnert et al. |
| 2010/0330233 A1 | 12/2010 | Reyes et al. |
| 2015/0110920 A1 | 4/2015 | Armstrong et al. |
| 2015/0250132 A1 | 9/2015 | Brody et al. |

FOREIGN PATENT DOCUMENTS

| | | |
|---|---|---|
| WO | 0051418 A1 | 9/2000 |
| WO | 2010050812 A2 | 5/2010 |

OTHER PUBLICATIONS

International Application No. PCT/CA2019/051332, International Preliminary Report on Patentability dated Mar. 23, 2021.

* cited by examiner

APPARATUS AND METHOD FOR FUSING CURD

FIELD OF INVENTION

The present disclosure relates to the field of cheese making. In particular, the present disclosure relates to fusing curd.

BACKGROUND

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

Cheese curds can constitute a final product for the purpose of eating as a snack or as an ingredient in preparing dishes such as poutine, or can be considered as an intermediary product to be used in a subsequent cheese making process. The manufacturing of cheese curds requires that curd be fused, which involves intense manual labor and long time periods.

For example, when making cheddar cheese, curd is fused by being manually formed into a thick layer that is cut into slabs of curd and the slabs are stacked atop each other to form curd stacks. The cutting and manipulation of the curd and the stacking of curd slabs promotes the synereris process necessary to produce cheese. The stacking of the slabs of curd results in pressure being applied to the slabs, which causes whey to be expelled from the slabs. After ten minutes or so, the slabs are turned over and are again stacked atop each other and, in some instances, individual stacks are stacked atop one another. This can be repeated a number of times until the acidity of the curd stacks reaches a target pH value (e.g., a value comprised between 5.1 and 5.3) and proteins become aligned in the stack. When the target pH is reached, the curd stacks are milled into pieces of curd (cheese curds), which can then be either salted and packaged for consumer distribution, or used in a subsequent cheese making process. For example, when the cheese curds are used in making cheddar cheese or other types of salted or unsalted cheeses, the cheese curds are provided to a pressing device where they are pressed against each other to form a continuum and are subsequently cut into blocks of cheese, packaged and aged.

The curd stacks prepared using the manual curd fusing process outlined above still contain air pockets, water pockets and interstices such that when the curd stacks are subsequently subjected to the milling process, the resulting cheese curds are unevenly sized and include multiple fines, which give the cheese curds a poor appearance. Further, because the cheese curds are unevenly sized, it can become challenging to automatically package the cheese curds into packages that have a precise target weight.

Therefore, improvements in the manufacturing of cheese curds are desirable.

SUMMARY

The present disclosure allows for the fusion of curd and the making of cheese curds without requiring vast amounts of manual labor. The curd can be fused in an apparatus configured to form a curd stack in a container that has a temperature comprised within a temperature range that favors acidification of the cheese curd in the curd stack. The formation of the curd stack compresses the cheese curd in the curd stack, which causes the curd stack to express whey as the acidification of the curd takes place and as the syneresis process takes place. The curd stack is subjected to a vacuum, which assists in the removal of air from the curd stack.

In first aspect, the present disclosure provides an apparatus for fusing curd. The apparatus comprises: a container configured to receive curd therein to form a curd stack in the container; a vacuum system coupled to the container and configured to produce a vacuum in the container; a heating apparatus coupled to the container and configured to maintain a portion of the container or the entire container at a temperature comprised within a pre-determined temperature range; and an output coupled to the container and configured to cut a block of the curd stack formed in the container and to release the block from the container.

In another aspect, the present disclosure provides a method of fusing curd. The method comprises: obtaining the curd; stacking the cheese curd to obtain a curd stack; and subjecting the curd stack to a vacuum. Also, when the curd stack is subjected to the vacuum, maintaining the curd stack at a temperature comprised within a pre-determined temperature range, the temperature range being a range that supports micro-organism activity in the curd stack, which micro-organism activity acidifies the curd in the curd stack; removing whey expressed from the curd stack; and monitoring an acidity of the curd stack. When the acidity of the curd stack is within the pre-determined acidity range, a portion of the curd stack is removed from the vacuum.

The above aspects of the present disclosure allows for the production of a cheese block that has a continuous casein matrix, which is considerably free from water pockets, air pockets and interstices. Once obtained, the cheese block can be milled into cheese curds, which, because of the continuous casein matrix, have substantially similar dimensions and very few fines.

DESCRIPTION

Figure 1A:
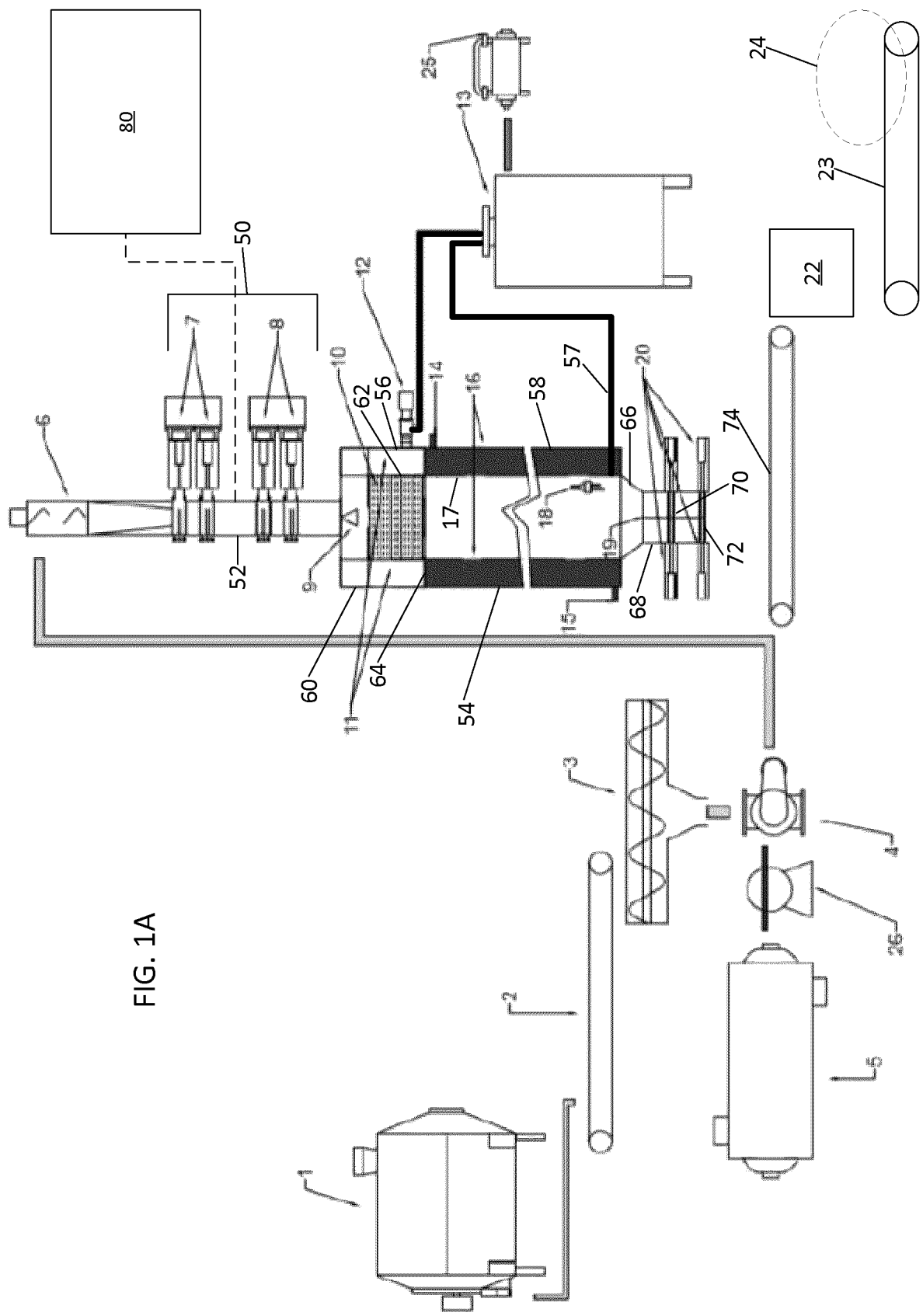
FIG. 1A shows a side elevation view of an embodiment of an apparatus for fusing curd in accordance with the present disclosure.

For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments herein. Also, the description is not to be considered as limiting the scope of the embodiments described herein.

The present disclosure relates to an apparatus for fusing curd and to a method of fusing curd. The method of fusing curd and the apparatus for fusing curd of the present disclosure can provide fused curd which, when milled or cut into cheese curds, provides substantially evenly sized cheese curds with a reduced number of fines and can eliminate the manual labor required to fuse curd when compared to traditional, manual fusing of curd such as, for example, as part of a cheddaring process. The method of fusing curd and the apparatus for fusing curd in accordance with the present disclosure improves predictability of the quality of the cheese curds and allows flexibility in the curd fusing process.

FIG. 1A shows a block diagram of an embodiment of an apparatus in accordance with the present disclosure. The block diagram of the apparatus shows a cheese-making vat 1 in which milk, enzymes, acids, and/or minerals are mixed, heated and cooked to produce curd, i.e., to produce coagulated milk. As will be understood by the skilled worker, it is not necessary to use a cheese-making vat; rather, any suitable curd producing apparatus can be used without departing from the scope of the present disclosure. Further, any suitable ingredients can be used in making the curd without departing from the scope of the present disclosure.

Subsequent the production of the curd in the cheese-making vat 1, the curd is moved out of the cheese-making vat 1 and onto a perforated conveyor belt 2 (draining belt). The perforated conveyor belt 2 can comprise, for example, a mesh filter made of cloth, stainless steel or polypropylene. As the perforated conveyor belt 2 displaces the curd away from the cheese-making vat 1, whey contained in the curd is drained by gravity, through the perforated conveyor belt 2. The whey can be recovered and used in other processes. It is not necessary that a perforated conveyor belt be used to drain whey out of the curd. Rather, any suitable apparatus configured to drain whey from curd can be used without departing from the scope of the present disclosure. For example, a whey drainage drum or a whey screen and a non-perforated belt could be used instead of the perforated conveyor belt 2. The perforated conveyor belt 2 and the speed at which it conveys the curd can be configured to drain the curd of a pre-determined amount of whey as the curd is conveyed to an auger 3. For example, the perforated conveyor belt can be configured to drain the curd of 90% of its whey. Optionally, a mixing device can be located and configured to mix or toss the curd that is on the perforated conveyor belt 2 as the curd is being conveyed away from the cheese-making vat 1. The mixing/tossing can be implemented to further control the humidity level and the amount of whey in the curd.

The perforated conveyor belt 2 drains the curd from whey and moves the curd from the cheese-making vat 1 to the auger 3. As the curd is fed, by the perforated conveyor belt 2 to the auger 3, the auger 3 breaks up the curd and provides the (broken up) curd to a rotary valve 4. It is not necessary that an auger be used. Any suitable apparatus configured to break up curd can be used instead of an auger. In some cases, the skilled worker may recognize that the curd does not need to be broken up and, instead of the perforated conveyor belt 2 providing the curd to the auger 3, the perforated conveyor belt 2 can provide the curd directly to the rotary valve 4.

The rotary valve 4 has an air input portion connected to a blower 26 that is configured to push curd arriving in the rotary valve toward a cyclone separator 6 that separates the curd from air. The air blown by the blower 26 is provided and heated, by a heating apparatus 5, to a temperature selected to maintain the temperature of the curd at a target temperature, which can be selected as a function of a target rate of acidification of the cheese curd (change in the pH of the cheese curd as a function of time). Any suitable type of heating apparatus and blower can be used without departing from the scope of the present disclosure.

The rotary valve 4 dispenses the curd to the cyclone separator 6. It is not necessary that a rotary valve 4 be used to dispense the curd to the cyclone separator 6. Rather, any apparatus configured to dispense the curd to the cyclone separator can be used without departing from the scope of the present disclosure.

The curd and air arriving at the cyclone separator 6 are separated with the air exiting the cyclone separator 6 and the curd falling toward an airlock 50 formed in a conduit 52, between two butterfly valves 7 and 8. The airlock 50 allows to introduce curd into a container 54 that is under vacuum without breaking the vacuum in the container 54. The butterfly valves 7 and 8 are shown as being double butterfly valves; however, this need not be the case. The butterfly valves can be single butterfly valves without departing from the scope of the present disclosure. The vertical space between the butterfly valves 7 and 8 can be connected to a vacuum system 80 containing a vacuum pump (which could be the vacuum pump 25). The vacuum system 80 is equipped with a valve system that allows the aforementioned vertical space to be open to the atmosphere or, to allow the vertical space to be pumped down the same pressure as in the container 54. As such, the top butterfly valve 7 can be open when the vertical space is at atmosphere (i.e., at about the same pressure as in the cyclone separator) and the bottom butterfly valve 8 is closed. Further, the bottom butterfly valve 8 can be opened when the top butterfly valve 7 is closed and the vertical space between the two butterfly valves is at the same pressure as in the container 54. This allows each butterfly valve to be open only when both sides of the butterfly valve are at the same pressure. This reduces the wear and tear of the butterfly valves 7 and 9. In other embodiments, other types of valves can be used instead of, or in combination with butterfly valves without departing from the scope of the present disclosure. As an example, guillotine valves can be used.

The container 54 has a top portion 56 and a bottom portion 58. The top portion is connected to the conduit 52. The curd is received from the air lock 50 at the top portion 56. The curd falls onto a dispersing device 9, for example, a dispersion plate or dispersion cone. This allows the curd to disperse in the container 54 as it falls to the bottom portion 58 and accumulates in height to form a curd stack. As will be understood by the skilled worker, the presence of a dispersion device is not mandatory and other embodiments can function without the presence of a dispersion device.

The bottom portion 58 has a heat shroud 16 that surround the curd stack. This allows the curd stack to be maintained at a target temperature. The heat shroud 16 in the embodiment shown at FIG. 1A is a double wall heater with heated water present between the two walls of the double wall heater. The water can be heated remotely from the heat shroud 16 and circulated in the heat shroud 16. For example, a source of hot water (not shown) can be connected to connector 15, which allows the hot water to enter the double wall heater. After circulating in the double wall heater, the water can exit through the connector 14. Alternatively, water can be heated in the heat shroud by any suitable heating means such as, for example, an electrical heating element. As will be understood by the skilled worker, maintaining the temperature of the curd stack at a pre-determined temperature (e.g., a temperature comprised between 28° C. and 44°

C.) is beneficial to micro-organism activity in the curd stack, which activity acidifies the curd stack and leads to syneresis (whey is expressed from the curd stack). As such, maintaining the curd stack at a temperature within the pre-determined temperature range controls the lowering of the pH of the curd stack and the syneresis in the curd stack. This promotes the formation of fibre in the curd stack. In embodiments of the present disclosure, curd can enter the container at a pH comprised between, for example, about 6.3 and about 6.0 and be ready for removal from the container with 1 or 2 hours, at a pH comprised between 5.3 and 5.1. As will be understood by the skilled worker, maintaining the temperature of the curd stack between 28° C. and 44° C. using water circulating in a jacket can involve heating the water to at least 28° C. and to about 44° C. or to a temperature higher than 44° C.

As will be understood by the skilled worker, the acidity of the whey changes as the mixture of whey and curd is transported from the cheese making vat 1 to the container 54. The whey acts as a solvent for the minerals present in the curd or curd structure: the more acidic the whey is, the more demineralization of the curd is important. As will be understood by the skilled worker, in order to avoid demineralization of the curd to occur too fast, it can be important to ensure that the pH of the whey prior to the curd entering the container 54 is at a value greater than, for example, about 5.8. This can be achieved by controlling, through known means, the time span during which the curd and whey mixture is conveyed from the cheese making vat 1 to the container 54 and by controlling the temperature of the whey and curd mixture as it is conveyed to the container 54.

Figure 1B:
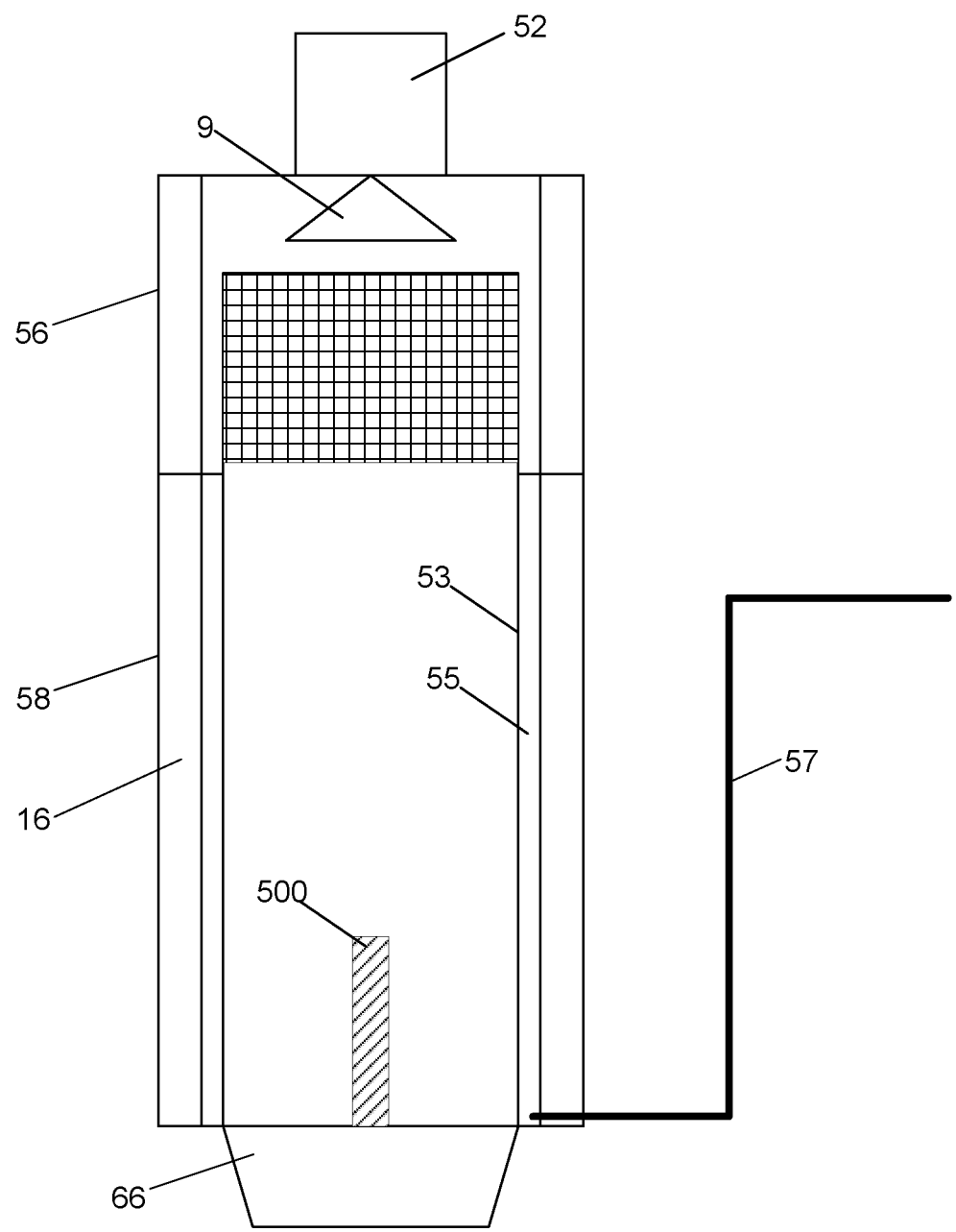
FIG. 1B shows a cut-through, partial and side elevation view components of the apparatus of FIG. 1A.

FIG. 1B shows a cut-through, partial and side elevation view the bottom portion 58 and the heat shroud 16. As shown in FIG. 1B, the bottom portion comprises a sieve container 53 that is configured to receive and hold curd therein and that is also configured to drain whey expressed from the curd stack. The whey expressed by the curd stack drains out of the sieve container 53 through a mesh opening 500 (or a plurality of mesh openings) and into a gap or space 55 between the sieve container 53 and the heat shroud 16. From the space 55, the whey can be drained into the container 13, through a conduit 57. The mesh opening 500 can have a mesh value comprised between 100 and 150. Any other mesh values that allow whey to drain and maintain structural integrity are considered to be within the scope of the present disclosure. The sieve container 53 can be referred to as a sieve or as a sieve portion. The gap or space 55 can be referred to as a whey accumulation portion, which is coupled to a vacuum system.

In some embodiments, the surface occupied by the mesh window 500 or by the multiple mesh windows can be about 5% of the surface of the sieve container 53. Any other percentage value of the surface occupied by the mesh window 500 or by the multiple mesh windows that allows adequate draining of whey is to be considered within the scope of the present disclosure. As will be understood by the skilled worker the materials used in the apparatus embodiments of the present disclosure are preferably food grade material and can include, for the sieve container, food grade aluminum, food grade stainless steel or any other suitable material.

In the embodiment of FIG. 1A and FIG. 1B, contrary to the bottom portion 58, the top portion 56 of the container 54 of the does not have a heat shroud. However, embodiments where the top portion and the bottom portion are surrounded by a heat shroud are considered to be within the scope of the present disclosure. In the embodiment of FIG. 1A, the top portion 56 has an outer wall 60 and an inner mesh 62 that is spaced apart from the outer wall 60 of the container 54. The inner mesh 62 reduces the amount of curd that could eventually fall onto the top 64 of the heat shroud 16.

The top portion 56 is connected to the vacuum pump 25 through a connector 12. In this embodiment, a container 13 is inline between the connector 12 and the vacuum pump 25. The container 13 is configured to receive and contain any whey that reaches the connector 12.

The pressure to which the curd in the curd stack is subjected to increases as curd is fed in the container 54. The pressure at the bottom of the curd stack is greater at the bottom of the stack than higher in the stack. This pressure allows the curd, now mostly free of whey, to fuse into a continuous stack, i.e. a stack free of interstices (air pockets) and pockets of water or, at least having less interstices and pockets of water than a curd stack produce by the customary manual process. Additionally, the inventor has discovered that the application of a vacuum to the container 54 produces a superior continuous stack of curd in comparison to a stack of curd produced without the application of a vacuum to the container. It is believed that forming a curd stack under vacuum further helps in decreasing the amount of air trapped in the curd stack. That is, forming the curd stack under vacuum helps decrease the number of air pockets and interstices in the curd stack. The pressure at the bottom of the curd stack or at a bottom portion of the curd stack can be comprised between about 0.02 $kg/cm^2$ and about 0.05 $kg/cm^2$. For example, the pressure can be about 0.045 $kg/cm^2$, which is produced by a curd stack having a height of about 5 meters. However, any other suitable pressure at the bottom of the curd stack can be used without departing from the scope of the present disclosure.

The bottom portion 58 of the container 54 has a funnel shaped portion [19, 66] that funnels the curd stack into a conduit 68. The funnelling of the curd stack causes lateral compression of the curd stack as well as longitudinal stretching of the curd stack. The lateral compression (compression in a plane that is perpendicular to the length of the curd stack or perpendicular to the length of the cylinder 54) and longitudinal stretching (stretching along the axis defined by length of the curd stack or the cylinder 54) helps create a fibrous texture in the curd stack, which contributes to the continuousness of the curd stack. As will be understood by the skilled worker, in some embodiments, the container 54 can be shaped as a circular cross-section cylinder and the funnel shaped portion [19, 66] can have a rectangular cross-section. Any other suitably shaped cylinder and funnel portion are to be considered within the scope of the present disclosure. The funnel shaped portion [19, 66] can be referred to as an output component of the apparatus for fusing curd.

The conduit 68 is equipped with two guillotine blades 20. Namely the top guillotine blade 70 and the bottom guillotine blade 72. The guillotine blades are configured to be open and closed sequentially in order to maintain vacuum in the container 56. With the bottom guillotine blade 72 closed, the top guillotine blade 70 is open, which allow the curd stack to move downward toward the second guillotine blade 72. When the curd stack rest on the guillotine blade 72, the first guillotine blade 70 is closed, thereby cutting a block portion of the curd stack, the block portion being located between the top guillotine blade 70 and the bottom guillotine blade 72. At this point, with the top guillotine blade closed, the bottom guillotine blade 72 is open, which causes the block portion to fall onto a conveyor device 74. The conveyor device 74 conveys the block portion to a cutting device 22 that receives the block portion and cuts it or mills it into pieces of cheese, which constitute the cheese curds. The cutting device 22 can include a grid against which the block is pushed to product the pieces. Any other suitable device that can cut the portion of the curd stack into cheese curds is to be considered within the scope of the present disclosure. The guillotine blades 70 and 72 can be said to define an output device.

The pieces cheese (cheese curds) are then provided to a conveying device 23, which allows the pieces to cool as the conveying device 23 conveys the pieces toward a salting zone 24 where the pieces are salted. The time duration during which the curds are conveyed to the salting zone 24, which is the time during which the cheese curds cool, can be approximately 10 minutes. Any other suitable time duration can be used without departing from the scope of this disclosure. The salted cheese pieces can subsequently be bagged or be provided as an intermediary product for another cheese making operation.

Advantageously, the automated/mechanized method of fusing curd described above results is block of curds that have a continuous casein matrix substantially free of interstices and water pockets. The quality of the blocks of curd produced in accordance with the present disclosure is such that the cutting device does not encounter interstices or water pockets as the block is cut into pieces. This produces uniformly sized cheese curds without any substantial amount of curd fines. The uniform size of the pieces of curd simplifies the packaging of the pieces in that it is simpler to achieve the target weight of the curd package. Furthermore, the cheese curds obtained in accordance with the present disclosure have been found to have a particularly pleasant cheese squeak and mouth feel in comparison with cheese curds prepared by prior art methods.

Figure 2:
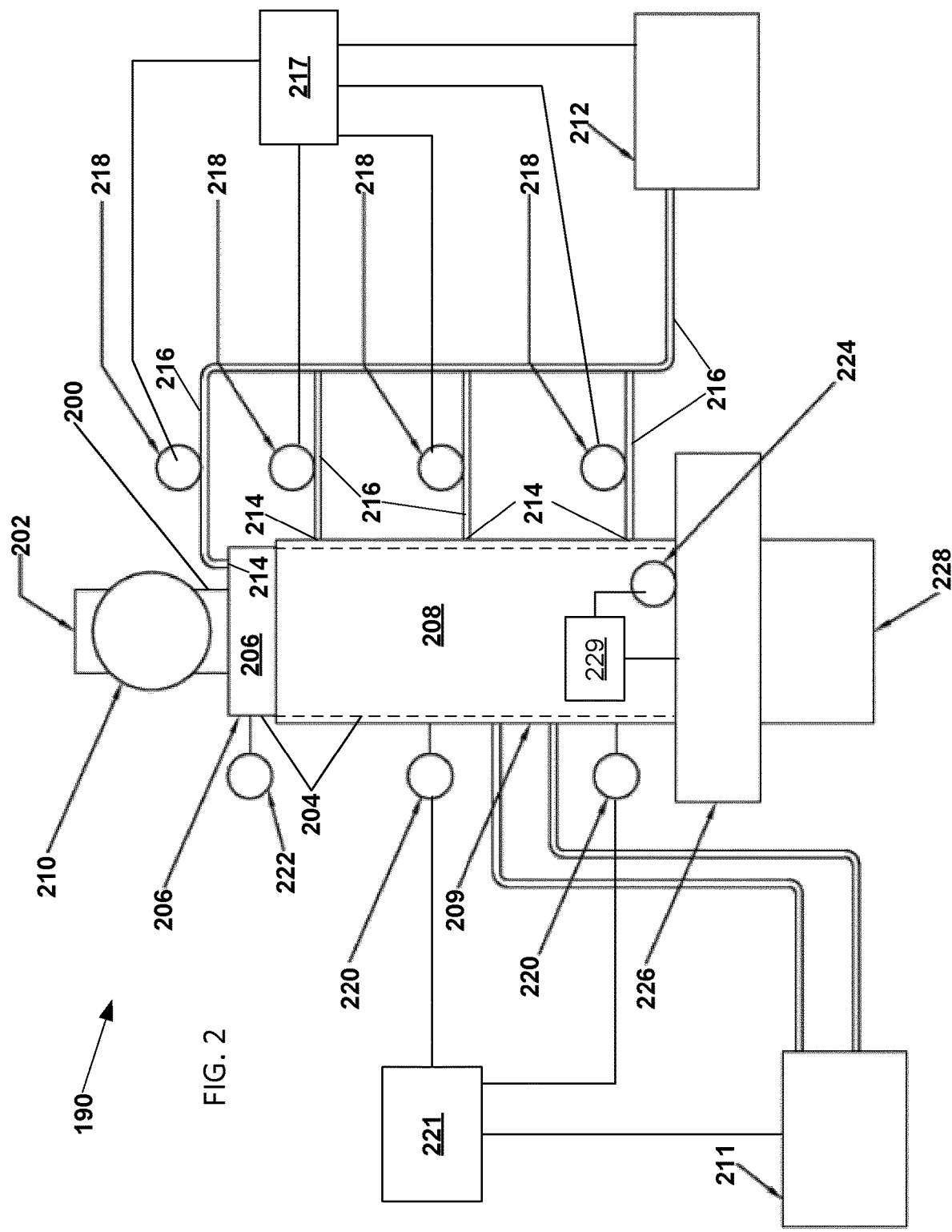
FIG. 2 shows a side elevation view another embodiment of an apparatus for fusing curd in accordance with the present disclosure.

FIG. 2 shows a block diagram of another embodiment of an apparatus 190 in accordance with the present disclosure. The apparatus 190 comprises a conduit 200 that defines a curd entry opening 202 at which curd is received or obtained, from any suitable upstream curd delivery arrangement, such as the curd delivery arrangement shown in FIG. 1A, that is upstream from the butterfly valve 7. The conduit 200 is coupled to a container 204, which comprises a top portion 206 and a bottom portion 208. The conduit 200 is equipped with a rotary valve 210. Surrounding the bottom portion 208 is a temperature controlled jacket 209 configured have circulating therethrough hot water provided by a hot water heater 211. Although not shown in FIG. 2, the embodiment of FIG. 2 includes a sieve container, similar to the sieve container 53 shown in FIG. 1B, that is configured to receive and hold curd therein and that is also configured to drain whey expressed from the curd stack. The whey expressed by the curd stack drains out of the sieve container and into a gap or space between the sieve container and the heat shroud (jacket). From that space, the whey can be drained out of the container 204 by a vacuum system 212, through a conduit connecting the space where the whey accumulates to the vacuum system.

The vacuum system 212 is coupled to the container 204 and is configured to produce a vacuum inside the container 204. The vacuum system 212 also allows to drain whey as it is expressed from a curd stack when the curd stack is being formed in the container 208. In this embodiment, the coupling of the vacuum system 212 to the container 204 is effected through vacuum ports 214 that fluidly connect the inside of the container 204 to conduits 216, which are connected to the vacuum system 212. The vacuum ports 214 in the present embodiment are spaced apart vertically, which provides redundancy in the event where one of the vacuum ports becomes obstructed. In the embodiment of FIG. 2, vacuum probes 218 are coupled to conduits 216 and are configured to measure the pressure in the container 204 at various positions along the height of the container 204. The vacuum probes 218 and the vacuum system 212 can be coupled to a display and/or controller unit 217, which can be configured to display the pressure measured by the various vacuum probes 218 and to control, in accordance with know means, the vacuum system according to the measured pressure. As will be understood by the skilled worker, any practical number of conduits 216 can be used to connect the container 204 to the vacuum system 212. Further, the conduits 216 can be spaced apart in any suitable arrangement (e.g. around the circumference of the cylinder, at different heights along the container, through the top of the container, etc.)

In the present embodiment, the rotary valve 210 allows the cheese curd arriving at the opening 202 to be transported through the conduit 200 and into the container while acting as an airlock. As such, the apparatus shown in FIG. 2 differs from the apparatus shown in FIG. 1A in that the apparatus of FIG. 2 does not have butterfly valves that define an airlock. The apparatus 190 further comprises temperature probes 220 that measure the temperature of the water circulating in the jacket 209. The temperature probes 220 and the heating apparatus 211 are both coupled to a thermostat 221, which can be programmed by the skilled worker to control the heating apparatus 211 as a function of the temperature measurements obtained from the temperature probes. One of temperature probes 220 can be configured to measure the water temperature as the water goes into the jacket 209 and the other temperature probe 220 can be configured to measure the temperature of the water as it exits the jacket 209. Also shown in FIG. 2 is a level probe 222, which is configured measure the level of curd in the container 204. The level probe 222 can be a radar level probe or any other suitable type of level probe. The rotary valve 210 can be referred to as an airlock or as an airlock device or as an airlock portion. Alternatively, one or both the temperature probes can be installed to measure the temperature of the curd stack or the temperature of the container.

Rather than having a conductivity probe 18 as in the apparatus of FIG. 1A, the apparatus 190 of FIG. 2 comprises a pH probe 224 configured to measure the pH of the curd stack at a bottom portion of the curd stack. Also shown in FIG. 2 is a slab cutter and milling unit 226 and a cheese curd outlet 228. The slab cutter and/or milling unit 226 can be configured cut a block of curd from the curd stack formed in the cylinder 204 and to mill that block into cheese curds or can be configured to simply cut a block for the curd stack. As will be understood by the skilled worker, the measured acidity of the curd stack (of the portion of the curd stack) is important in deciding when the portion of the curd stack is ready to be cut and removed from the container. FIG. 2 shows an output controller 229 coupled to the pH probe 224 and to the slab cutter and milling unit 226, which can be referred to as a cutting device. The output controller 229 can be programmed by the skilled worker to cause the slab cutter and milling unit 226 to cut a block of the curd stack fused in the apparatus 190 and to output the block from the apparatus 190 when the controller detects that the pH value output by the pH probe meets a pre-determined value (e.g. 5.2) or is within a pre-determined pH range (e.g. a range spanning from about 5.3 to about 5.1). The controller can also be programmed to cut the block into cheese curd and to output the cheese curds. The slab cutter and milling unit 226 can be referred to as an output device.

The container 204 can have any suitable shape and dimensions. For example, the container 205 can be cylinder-shaped with a diameter of 1.5 m and a height of between 2 m and 5 m or more. Any other suitable dimensions that allow to fuse curd such that a block from a curd stack is substantially free of air pockets, whey pockets and interstices are considered to be within the scope of the present disclosure. As will be understood by the skilled worker, the container 204 can have a transition region where the shape of the container goes from a circular cross-section cylinder to a rectangular or square cross section conduit (not shown).

As will be understood by the skilled worker, the vacuum system 212 of the embodiment of FIG. 2 or the pump 25 of the embodiment of FIG. 1A can be coupled to one or to more than one container as shown in these figures without departing from the scope of the present disclosure. Similarly, a same water heating apparatus can be coupled to one or more than one heat shroud or jacket without departing from the scope of the present disclosure.

Figure 3:
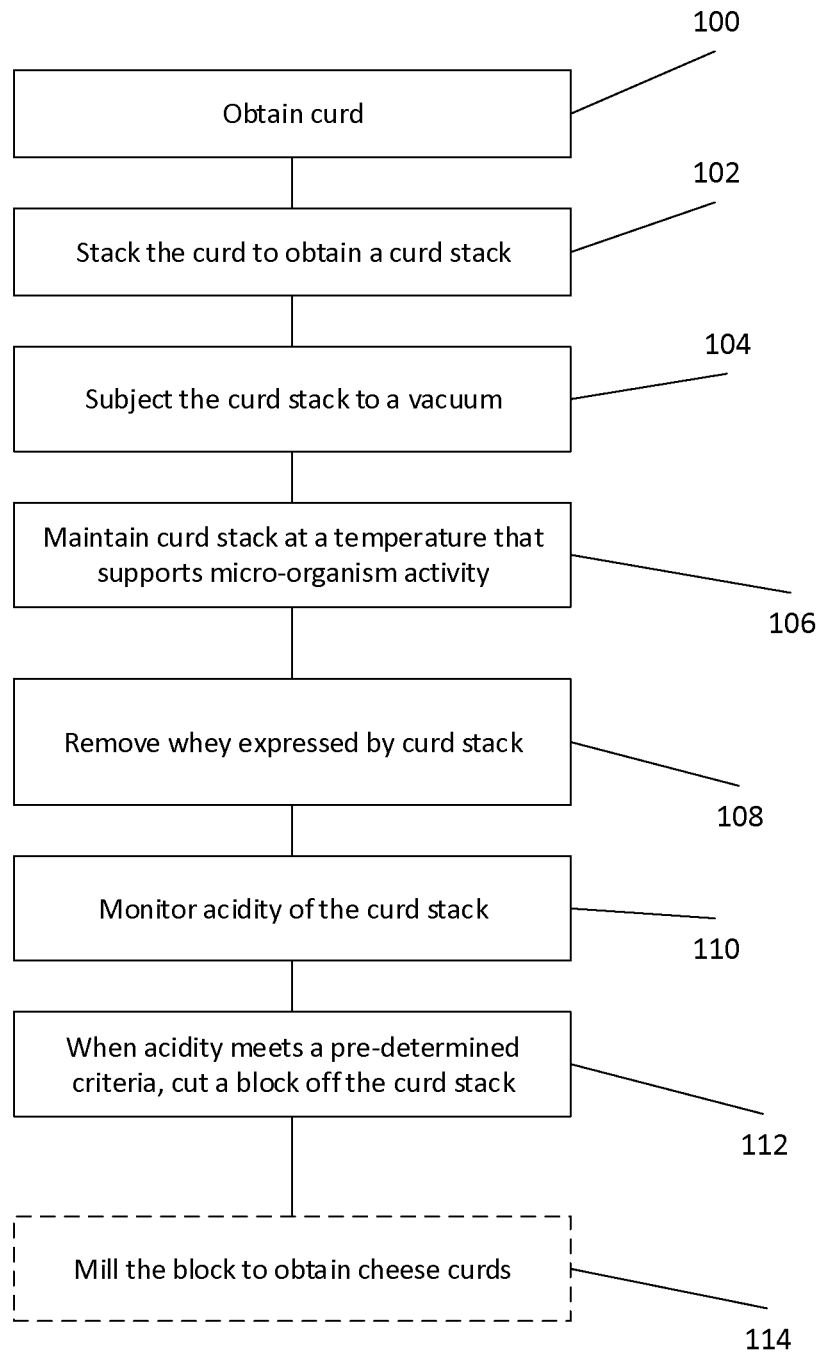
FIG. 3 shows a flowchart of an embodiment of a method for fusing curd in accordance with the present disclosure.

FIG. 3 shows a flowchart of an embodiment of a method of fusing cheese curd in accordance with the present disclosure. At action 100, the curd is obtained, for example, in a container as shown in the embodiments of FIGS. 1 and 2. At action 102, the curd is stacked (for example, in the aforementioned container) to obtain a curd stack. At action 104, the curd stack is subjected to a vacuum. As an example, the container can be subjected to the vacuum by the vacuum pump of the embodiment of FIG. 1A or the vacuum system shown in the embodiment of FIG. 2. The pressure in the vacuum can be comprised between, for example, 10 and 18 inches of mercury that is, between 33.9 kPa (330 mbar) and 61.0 kPa (610 mbar).

At action 106, the curd stack is maintained at a pre-determined temperature, which can be selected to control the rate at which the curd acidifies; that temperature can depend on the type of cheese being made, etc. or, within a pre-determined range of syneresis temperatures. In some embodiments, the syneresis temperature can be between 28 and 44° C. For example, the temperature can be maintained by the heat shroud of FIG. 1A or by the temperature controlled jacket of FIG. 2. The temperature is such that it supports micro-organism activity in the curd stack.

At action 108, whey expressed by the curd stack is removed, for example, by a vacuum system or vacuum pump. At action 110, the acidity of the curd stack is monitored, for example, by a pH meter. At action 112, when the acidity meets a pre-determined criteria, a block is cut off the curd stack. Subsequently, the cut-off block can milled to obtain cheese curds.

The properties of the curd produced by the curd producing apparatus (for example the cheese making vat 1 at FIG. 1A) depend on the ingredients used and on the thermal treatment of these ingredients. In the present apparatus for fusing curd and in the present method of fusing curd, the ingredients and the thermal treatment of these are selected as a function of the type of cheese desired. The invention described herein can be used to produce, for example, Cheddar cheese, semi-firm un-ripened cheese, types of cheese sold as curds, Gouda, Emmental, and Swiss—type cheeses.

As will be understood by the skilled worker, the embodiments described in the present disclosure and their controllers can include a processor and a processor-readable memory that has recorded thereon instructions to be carried by the processor to perform method steps described herein. Further, embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. An apparatus for producing cheese curds to be eaten as a snack, to be used in preparing a dish, or to be pressed together to form a block of cheese, the apparatus comprising:
   a container;
   a vacuum system coupled to the container and configured to produce a sub-atmospheric pressure in the container, the sub-atmospheric pressure being comprised within a range of about 330 mbar to about 610 mbar;
   an input airlock coupled to the container, the input airlock configured to receive curd at atmospheric pressure and to transfer the curd to the container when the container is at the sub-atmospheric pressure, to form a curd stack in the container;
   a pH measuring device installed in the container and configured to measure a pH of the curd stack in the containers
   a heating apparatus coupled to the container and configured to maintain a portion of the container or the entire container at a temperature comprised within a pre-determined temperature range;
   an output device coupled to the container and configured to cut a block of the curd stack formed in the container and to release the block from the container; and
   a cutting device configured to cut the block of curd into the cheese curds.

2. The apparatus of claim 1, wherein the pre-determined temperature range is selected to maintain the curd stack at a temperature that supports micro-organism activity in the curd stack, which micro-organism activity acidifies the curd in the curd stack, the pre-determined temperature range being between about 28° C. and about 44° C.

3. The apparatus of claim 1, wherein the container has a vertical length selected for the curd stack to attain a pre-determined height at which a bottom portion of the curd stack is subjected to a target pressure, the target pressure being comprised between about 0.02 kg/cm$^3$ and about 0.05 kg/cm$^2$.

4. The apparatus of claim 1, further comprising:
an output airlock portion configured to output the block.

5. The apparatus of claim 1, further comprising a cyclone separator configured to receive a flow of air and of curd, the cyclone separator configured to separate the curd from the air and to provide the curd to the input airlock portion, the input airlock including at least one of a rotary valve and a set of butterfly valves.

6. The apparatus of claim 3, wherein the output airlock portion includes guillotine valves, the guillotine valves being vertically spaced apart and configured to cut the curd stack to obtain the block.

7. The apparatus of claim 1, wherein the vacuum system is further configured to remove whey from the container when the apparatus is in operation and whey is expressed from the curd stack.

8. The apparatus of claim 4, wherein:
the container includes a sieve portion and a whey accumulation portion,
the sieve portion is configured to drain whey expressed from the curd stack to the whey accumulation portion, and
the vacuum system is coupled to the whey accumulation portion.

9. The apparatus of claim 1, wherein the heating apparatus includes a jacket surrounding the container, the jacket being configured to be connected to a hot water source and to circulate, in the jacket, hot water obtained from the hot water source.

10. The apparatus of claim 9, wherein the hot water source is configured to heat water at a temperature comprised between at least 28° C. and about 44° C. or more than 44° C.

11. The apparatus of claim 1, further comprising a temperature probe coupled to the container and configured to measure a temperature of the container.

12. The apparatus of claim 7, further comprising a thermostat coupled to the temperature probe and to the heating apparatus, the thermostat configured to obtain a temperature measurement from the temperature probe and to control the heating apparatus in accordance with the temperature measurement and in accordance with a target temperature.

13. The apparatus of claim 1, wherein the vacuum system comprises a vacuum port coupled to the container and a vacuum probe coupled to the vacuum port, the vacuum probe configured to measure a pressure at the vacuum port, the apparatus further comprising a pressure controller coupled to the vacuum system and to the vacuum probe, the pressure controller configured to obtain a pressure measurement from the vacuum probe and to control pressure in the container as a function of the pressure measurement and as a function of the target pressure.

14. The apparatus of claim 1, further comprising a dispersion device coupled to the container and configured to receive the curd and to disperse the curd in the container.

15. The apparatus of claim 14, wherein the dispersion device is a dispersion cone or a dispersion plate.

16. The apparatus of claim 1, further comprising an output controller coupled to the acidity measuring device and to the output device, the controller being configured to activate the output device to cut a block of the curd stack when the pH measuring device measures a pre-determined pH value or when the pH measuring device measure a pH value that is comprised within a pre-determined pH range.

17. The apparatus of claim 1, further comprising a level probe configured to monitor a height of the curd stack.

18. The apparatus of claim 1, further comprising an output component coupled to the container, at a bottom portion of the container, the output component configured to receive the curd stack and to stretch the curd stack longitudinally along an axis parallel to a length of the container, and also configured to compress the curd stack laterally, in a plane perpendicular to the length of the container.

19. The apparatus of claim 18, wherein the output component includes a funnel section.

20. The apparatus of claim 18, wherein the output component is configured to receive a curd stack having circular cross-section and to produce an output curd stack that has a square cross-section or a rectangular cross-section.

* * * * *